(12) United States Patent
Pandharipande et al.

(10) Patent No.: US 9,854,644 B2
(45) Date of Patent: Dec. 26, 2017

(54) LIGHTING CONTROL ANALYZER

(71) Applicant: PHILIPS LIGHTING HOLDING B.V., Eindhoven (NL)

(72) Inventors: Ashish Vijay Pandharipande, Eindhoven (NL); David Ricardo Caicedo Fernandez, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 237 days.

(21) Appl. No.: 14/759,784

(22) PCT Filed: Jan. 3, 2014

(86) PCT No.: PCT/IB2014/058029
§ 371 (c)(1),
(2) Date: Jul. 8, 2015

(87) PCT Pub. No.: WO2014/108815
PCT Pub. Date: Jul. 17, 2014

(65) Prior Publication Data
US 2015/0351198 A1    Dec. 3, 2015

Related U.S. Application Data

(60) Provisional application No. 61/750,002, filed on Jan. 8, 2013.

(51) Int. Cl.
*H05B 37/02* (2006.01)
*G05B 15/02* (2006.01)
*F24F 11/00* (2006.01)

(52) U.S. Cl.
CPC ........ *H05B 37/0227* (2013.01); *F24F 11/006* (2013.01); *G05B 15/02* (2013.01); *H05B 37/0245* (2013.01); *H05B 37/0281* (2013.01)

(58) Field of Classification Search
CPC ............ H05B 37/0227; H05B 37/0281; H05B 37/0245; G05B 15/02; F24F 11/006
See application file for complete search history.

(56) References Cited

U.S. PATENT DOCUMENTS 5,640,143 A * 6/1997 Myron ................. G08B 29/185
                                                        250/DIG. 1
8,179,407 B2 * 5/2012 Ko ....................... G09G 3/3413
                                                        345/691

(Continued)

FOREIGN PATENT DOCUMENTS

WO    WO2012137125A2  A2    10/2012

*Primary Examiner* — Ramesh Patel

(57) ABSTRACT

The present invention relates to a lighting control analyzer (170), and a corresponding method (600), for determining occupancy behavior in an area (110, 200) illuminated by at least one lighting device (120*a-c*) controllable by a lighting controller (160). The lighting control analyzer is adapted to receive light settings (d) for control of the at least one lighting device, the light settings being determined by the lighting controller using a lighting control strategy for the area. The lighting control strategy represents a desired illumination of the area, based on presence information associated with the area. The lighting control analyzer is further adapted to determine the occupancy behavior, based on the light settings and the lighting control strategy. The occupancy behavior may comprise normal locations of occupants (401-417), how often occupants are normally located at different locations, and entrance points of the area.

12 Claims, 5 Drawing Sheets

(56) References Cited

U.S. PATENT DOCUMENTS

| | | | |
|---|---|---|---|
| 8,510,255 B2* | 8/2013 | Fadell | G05B 15/02 |
| | | | 706/52 |
| 2012/0066168 A1* | 3/2012 | Fadell | G05B 15/02 |
| | | | 706/52 |
| 2013/0063046 A1* | 3/2013 | Pandharipande | H05B 37/0227 |
| | | | 315/297 |
| 2014/0375352 A1* | 12/2014 | Patel | G01R 31/001 |
| | | | 324/764.01 |

* cited by examiner

LIGHTING CONTROL ANALYZER

CROSS-REFERENCE TO PRIOR APPLICATIONS

This application is the U.S. National Phase application under 35 U.S.C. §371 of International Application No. PCT/IB2014/058029, filed on Jan. 3, 2014, which claims the benefit of U.S. Provisional Patent Application No. 61/750,002, filed Jan. 8, 2013. These applications are hereby incorporated by reference herein.

FIELD OF THE INVENTION

The present invention relates to lighting systems, and in particular to methods and apparatus related to control of such systems.

BACKGROUND OF THE INVENTION

Illumination of a room is typically provided by a lighting system comprising a plurality of lighting devices. Lighting systems often comprise controllers for controlling the lighting devices in order to provide a desired illumination in an energy efficient manner. In order to further improve energy efficiency or to adapt the illumination to changing conditions in the room, some lighting systems are equipped with sensors, such as motion or presence detectors. In such lighting systems, information from the sensors may for example be used to determine which lighting devices may be switched off or dimmed, without affecting the illumination of occupied parts of the room, in order to save energy.

However, it may be difficult to provide a desired illumination in a room in a sufficiently energy efficient manner. Existing methods of controlling a lighting system are far from optimal in all situations. Hence, it would be desirable to provide an alternative way of controlling lighting systems to achieve a desired illumination in a more energy efficient manner.

SUMMARY OF THE INVENTION

An object of at least some of the embodiments of the present invention is to provide a lighting control analyzer, and a corresponding method, for determining occupancy behavior in an area arranged to be illuminated by at least one lighting device, thereby allowing for, e.g., a more energy efficient illumination of the area, and/or a more efficient use of at least one system associated with the area, such as a system for heating, ventilation, air conditioning and/or blind control.

This and further objects of the present invention are for example achieved by means of a lighting control analyzer and a method having the features defined in the independent claims. Preferable embodiments of the invention are characterized by the dependent claims.

According to a first aspect of the present invention, a lighting control analyzer for determining occupancy behavior in an area arranged to be at least partly illuminated by at least one lighting device controllable by a lighting controller is provided. The lighting control analyzer is adapted to receive light settings for control of the at least one lighting device, wherein the light settings are determined by the lighting controller, using a lighting control strategy for the area. The lighting control strategy represents a desired illumination of at least part of the area, based on presence information associated with at least one location in the area. The lighting control analyzer is further adapted to determine the occupancy behavior, based on the light settings and the lighting control strategy.

According to a second aspect of the present invention, a method of determining occupancy behavior in an area arranged to be at least partly illuminated by at least one lighting device, is provided. The method comprises receiving light settings for control of the at least one lighting device, wherein the light settings are determined using a lighting control strategy for the area. The lighting control strategy represents a desired illumination of at least part of the area, based on presence information associated with at least one location in the area. The method further comprises determining the occupancy behavior, based on the light settings and the lighting control strategy.

The inventors have realized that when information about an area (e.g. presence of occupants or external light) is used to obtain light settings for illumination of the area using a lighting control strategy for the area, at least some of this information may be retrievable from the light settings, based on knowledge about the lighting control strategy. Accordingly, light settings for control of at least one lighting device adapted to illuminate at least part of the area, may be used together with the lighting control strategy to determine occupancy behavior in the area.

The present invention is advantageous in that occupancy behavior may be determined based on light settings for control of the at least one lighting device and the lighting control strategy, i.e. without additional input from sensors or other additional components. Moreover, since the lighting controller controls the at least one lighting device using the light settings, the light settings may be available at the lighting controller, i.e. the lighting control analyzer need not gather information from the at least one lighting device. The light settings may be received from the at least one lighting device, from the lighting controller, or via any other units of the lighting system. In an exemplifying embodiment, the lighting control analyzer may be added to an existing lighting system (comprising a lighting controller controlling at least one lighting device) by connecting it to the lighting controller, and the occupancy behavior determined by the lighting control analyzer may be used by the lighting controller to adapt the illumination provided in the area by the at least one lighting device, which may for example allow for a more energy efficient illumination of the area.

Another advantage of the present invention is that the determined occupancy behavior may be used to adapt and/or improve settings of other systems, such as systems associated with illumination, heating, ventilation and/or air conditioning of the area. This may for example allow for a more energy efficient utilization of these systems.

As the lighting control strategy represents a desired illumination of at least part of the area, based on presence information (e.g. presence of at least one occupant in at least one location of the area), the light settings determined by the lighting controller carry information about presence (or absence) of occupants in the area, since the light settings are determined based on such information. Hence, having knowledge of the lighting control strategy (it may for example be built into or preprogrammed into the lighting control analyzer, or it may be sent to the lighting control analyzer from e.g. the lighting controller), the lighting control analyzer may estimate presence of occupants based on the received light settings. For example, if the lighting control strategy involves illuminating locations around occupants more (intensely) than locations far from occupants, the lighting control analyzer may consider received light settings for intensely illuminating a location as indicating the presence of an occupant close to that location.

Estimating presence of occupants based on the received light settings and the lighting control strategy is advantageous in that presence of occupants may be detected by the lighting control analyzer without it having access to motion detectors, sound detectors, heat detectors or other types of presence sensors. Instead, the lighting control analyzer may take advantage of already existing presence sensors used by the lighting controller to determine a suitable illumination. The lighting controller may for example receive presence information from at least one presence sensor adapted to detect presence of at least one occupant in at least one location of the area. Additionally, or alternatively, the lighting control strategy may comprise an algorithm which determines the light settings, based on the presence information.

The occupancy behavior determined by the lighting control analyzer (or the corresponding method) may for example comprise normal/common locations of occupants in the area, how often different locations in the area are occupied and/or locations at which occupants normally enter/exit the area. Such occupancy behavior may for example be determined based on the above described estimated presence of occupants.

The area may be, e.g., a room, a set of rooms, a floor of a building, a section of a floor (or of a room), or an outside space with illumination. The area may even be a space comprising several floors.

The at least one lighting device may be a plurality of lighting devices (at least some of which being) adapted to illuminate different parts of the area. Additionally, or alternatively, one or more of the at least one lighting device may be movable/rotatable (or may be equipped with optical elements such as mirrors or lenses arranged to direct the light output of the lighting device to different parts of the area), such that a single lighting device may illuminate different parts of the area, depending on the light settings.

The lighting controller may be a device comprising e.g. a processor or any other type of processing unit/means. Alternatively, the lighting controller may be a functional aspect of another unit/device such as a controller or control system for a floor or building, e.g., involving heating, ventilation, air conditioning etc.

The lighting controller may be adapted to receive information about illumination of at least one location in the area provided by light sources other than the at least one lighting device. For example, there may be one or more light sensors adapted to measure light from external light sources (such as the sun), and to send the result to the lighting controller. The at least one light sensor may measure the external light itself or a combined illumination comprising the external light and an illumination provided by the at least one lighting device, from which the contribution provided by the external light may be estimated. The lighting controller may be adapted to determine the light settings, and thereby control the at least one lighting device, additionally based on the received illumination information (i.e. based on the received light settings, the received illumination information, and the lighting control strategy). For example, if the area is already illuminated by external light then the lighting controller may control the at least one lighting device to provide less illumination than in the case that the area is not already illuminated by external light. Light settings determined in this way may be indicative of light contributions from light sources other than the at least one lighting device.

The light settings may comprise instructions for selecting and/or switching on/off one or more of the at least one lighting device. The light settings may comprise instructions for selecting, e.g., amplitude, orientation (i.e. direction of illumination), frequency, or other spectral properties of the at least one lighting device. For example, at least one dimmer may be associated with the at least one lighting device and the light settings may comprise (or may be) dimming levels for the at least one dimmer. The at least one dimmer may be adapted to control the light output of at least one of the at least one lighting device.

The lighting control strategy may comprise constructive instructions for determination of the light settings, e.g. by the lighting controller. It may for example comprise algorithms on how to calculate the light settings. Alternatively, the lighting control strategy available at the lighting control analyzer may be a general guideline on how the area is to be illuminated, i.e. it need not comprise detailed information on how to calculate the light settings. In particular, this means that when determining the occupancy behavior based on the light settings and the lighting control strategy, the lighting control analyzer may not have knowledge of algorithms for determining light settings. Indeed, the lighting control analyzer may instead have access to general guidelines on how the lighting controller controls the illumination, and may comprise a processor (or any other type of processing means) for determining the occupancy behavior, based on such guidelines and the received light settings.

As described above, the lighting control strategy may represent (or describe) a desired illumination to be provided in at least part of the area, based on presence of at least one occupant in at least one location of the area, i.e. the lighting control strategy may represent different desired illuminations of the area associated with presence of occupants in different locations of the area. For example, the lighting control strategy may suggest illuminating locations close to occupants more (intensely) than locations far from occupants.

The lighting control analyzer may for example comprise a processor (or any other type of processing means) for determining the occupancy behavior, based on the received light settings and the lighting control strategy.

According to an embodiment, the lighting control analyzer may be adapted to determine the occupancy behavior, based on light settings for a plurality of time instants (or time intervals/periods), i.e. the lighting control analyzer may be adapted to receive light settings associated with a plurality of time instants (or time intervals/periods) and to determine the occupancy behavior, based on (at least some of) these received light settings. The present embodiment improves the accuracy of the determined occupancy behavior since effects of temporary distortions and/or short term deviations from normal/standard occupancy behavior are reduced. For example, the occupancy behavior may be determined based on as many received light settings as possible in order to increase accuracy. On the other hand, it may be desirable to provide updated information about occupancy behavior, so that the occupancy behavior may in some examples be determined based on a sequence of recent time instants (e.g. the last couple of minutes, hours, days, months, or years).

According to an embodiment, the lighting control analyzer may comprise a memory (or look-up table or any other means of data storage) adapted to store at least some of the received light settings, and the lighting control analyzer may be adapted to determine the occupancy behavior, based on at least some of the stored light settings.

According to an embodiment, the lighting control analyzer may be adapted to determine a level of illumination (or light distribution) of at least part of the area provided by the at least one lighting device, based on the received light settings. For example, the lighting control analyzer may have access to a mapping (or correlation) between light settings for the at least one lighting device and corresponding illuminations of the area. The lighting control analyzer may be adapted to determine the occupancy behavior, based on the determined illumination level and the lighting control strategy.

According to an embodiment, the lighting control analyzer may be adapted to determine momentary occupancy levels of locations in the area, based on the determined illumination and the lighting control strategy, wherein a momentary occupancy level of a location is indicative of the probability that the location is occupied at a certain time. The momentary occupancy levels may be determined based on received light settings for a single time instant, i.e. they need not be based on a sequence of received light settings.

The lighting control analyzer may be adapted to determine occupancy levels of locations in the area based on time averages of the determined momentary occupancy levels, wherein the occupancy level of a location is indicative of how often the location is occupied (e.g. the occupancy level may be indicative of a percentage of a time interval that the location is normally occupied). Hence, the occupancy levels reflect time-average properties of the area, rather than the temporary properties indicated by the momentary occupancy levels. Additionally or alternatively, the lighting control analyzer may be adapted to determine at least one occupant position in the area based on time averages of the determined momentary occupancy levels, wherein the occupant positions estimate normal/common locations of occupants in the area (i.e. a location which is more often occupied than other locations in the area).

Occupancy behavior, such as occupancy levels and/or occupant positions may be, e.g., useful for optimizing space use of the area and/or for configuration of systems for lighting, heating, ventilation and/or air conditioning of the area.

According to an embodiment, the lighting control analyzer may be further adapted to determine: when the received light settings change from a first state corresponding to a power saving mode for the at least one lighting device to a second state corresponding to an active mode of the at least one lighting device, at least one entrance point as a location in the area at which the at least one lighting device is activated (i.e. is switched from a power saving mode to an active mode) to provide illumination. The power saving mode refers to a mode in which the at least one lighting device provides less illumination than in an active mode, or in which it does not provide any illumination at all (e.g. is switched off or inactivated). The information that the at least one lighting device is in a power saving mode may indicate that the area is unoccupied. The information that one or more lighting devices switch to an active mode may indicate that someone has entered the area at a location illuminated by the one or more lighting devices. Hence, such a location may be identified as an entrance point of the area. Similarly, an exit point of the area (which may of course coincide with an entrance point) may be detected as a location illuminated just before the at least one lighting device enters a power saving mode. Knowledge of entrance/exits points of the area may be useful for detecting abnormal or unexpected behavior. For example, if sudden presence of a person is detected in a region too far from an entrance point, this may be an indication that the person has entered the room from an unexpected location, and an alarm may be issued.

Additionally, or alternatively, the lighting control analyzer may be adapted to detect when the received light settings correspond to a power saving mode of the at least one lighting device (or when the at least one lighting device has been in a power saving mode during a time longer than a threshold, e.g. to ensure that the room is really unoccupied). As described above, the power saving mode may correspond to the at least one lighting device being switched off or providing less illumination than in an active mode. The detection may indicate that the area is currently unoccupied and/or that it is currently not illuminated by the at least one lighting device. Hence, this may indicate an opportunity to configure/calibrate sensors and/or other components associated with the area. The lighting control analyzer may be adapted to indicate, in response to the detection, at least one of the group comprising (or combinations thereof):

a time point (or interval/period) for determining a detection threshold for a presence sensor configured to provide information about presence of at least one occupant in at least one location of the area;

a time point (or interval/period) for determining light contribution in (at least one location of) the area from light sources other than the at least one lighting device (e.g. by having light sensors measure an illumination level of the area); and a time point (or interval/period) for determining a mapping (or a correlation) between a light setting of a lighting device (i.e. one of the at least one lighting device, or a lighting device other than said at least one lighting device) and an illumination provided by the lighting device in at least one location of the area.

According to an embodiment, the lighting control analyzer may be further adapted to estimate an expected illumination of the area by the at least one lighting device, based on the determined occupancy behavior and the lighting control strategy, and to compare the expected illumination with illuminations corresponding to the received light settings for a plurality of time instants. Further, the lighting control analyzer may be adapted to determine, based on the comparisons, at least one light ingress location of the area and/or a light contribution from an external light source (i.e. a light source other that the at least one lighting device, e.g. the sun). The occupancy behavior may reflect time-average properties of the area, and the expected illumination corresponds to an illumination that is suggested by the lighting control strategy in response to momentary conditions of the area being in accordance with the determined occupancy information. If an expected illumination level is higher than the provided illumination level, this may indicate that a light source other than the at least one lighting device (i.e. an external light source) is contributing to the illumination of the area. By monitoring this difference for a plurality of time instants, the contribution of the external light source may be estimated and/or a location at which the external light enters the area may be estimated.

According to an embodiment, the lighting control analyzer may be adapted to provide information (or control parameters), based on the determined occupancy behavior, for control of illumination of the area (by the at least one lighting device and/or by at least one other lighting device); for control of the flow of sunlight in the area (e.g. by control of blinds or other blinding means arranged at a window); and/or for control of heating, ventilation and/or air conditioning of the area. Such information, or control parameters, may be provided by the lighting control analyzer to the above described systems connected to the area arranged to be at least partly illuminated by the at least one lighting device.

According to an embodiment, the lighting control analyzer may be adapted to estimate potential power savings of the at least one lighting device, based on the received light settings, the lighting control strategy and the determined occupancy behavior. For example, the power consumption of the at least one lighting device may be estimated based on the light settings. Potential illuminations corresponding to different light settings may be compared with the actually received light settings, and potential illuminations deemed similar enough to the actual one, with respect to the determined occupancy behavior (e.g. when the illumination is similar at occupied locations), may be considered a suitable alternative light setting. Potential power savings may be estimated by comparing the power consumptions of suitable alternative light settings with the power consumption of the actually received light settings.

Both long-term and short-term power consumption patterns may be estimated based on the received light settings. Based on knowledge of occupancy behavior (e.g. occupancy levels and/or occupant positions), new potential light settings may be determined that result in lower power consumption without affecting the resulting illuminance values at occupant locations. In particular, such light settings may be obtained as a result of an optimization problem that may be formulated as:

$$d' = \min_d |S(d) - I_D| \text{ such that } P(d^0) - P(d) \geq P_t$$

where $d^0$ is the received light settings, $S(d)$ is the resulting illumination pattern when applying the potential dimming vector d under strategy S, $I_D$ is the desired illumination pattern, $P(d)$ is the resulting power consumption of the system at dimming vector d, and $P_t$ is the targeted reduction of power consumption.

It will be appreciated that any of the features in the embodiments described above for the lighting control analyzer according to the first aspect of the present invention may be combined with the embodiments of the method according to the second aspect of the present invention.

Further objectives of, features of, and advantages with, the present invention will become apparent when studying the following detailed disclosure, the drawings and the appended claims. Those skilled in the art will realize that different features of the present invention can be combined to create embodiments other than those described in the following paragraphs.

BRIEF DESCRIPTION OF THE DRAWINGS

These and other objects, features and advantages of the present invention will be better understood through the following illustrative and non-limiting detailed description of preferred embodiments of the present invention, with reference to the appended drawings, in which.

All the drawings are schematic, not necessarily to scale, and generally only show parts which are necessary in order to elucidate the invention, wherein other parts may be omitted or merely suggested.

DETAILED DESCRIPTION OF EMBODIMENTS

Figure 1:
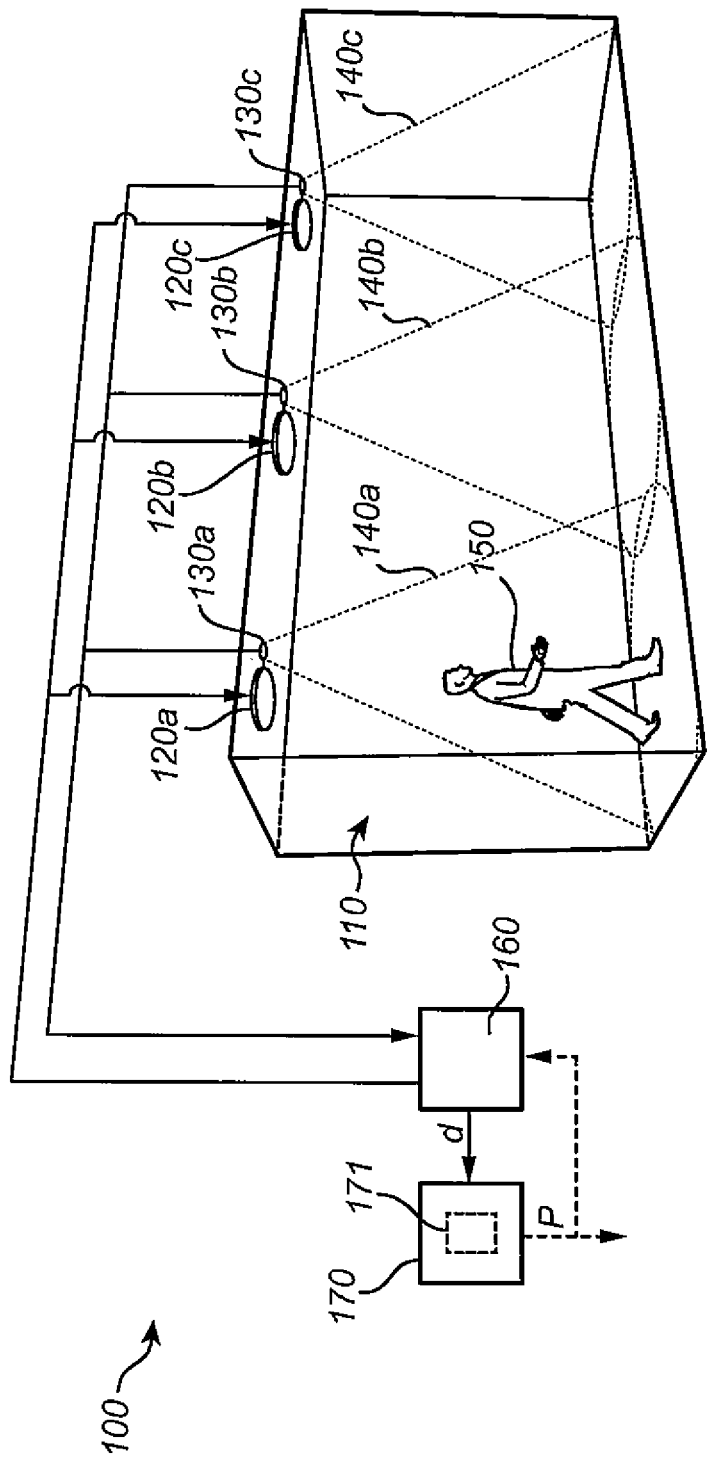
FIG. 1 schematically shows a lighting system comprising a lighting control analyzer according to an embodiment of the present invention.

With reference to FIG. 1, a lighting system according to an exemplifying embodiment of the invention will be described.

FIG. 1 shows a lighting system 100 for controlling illumination of an area 110. The area 110 is illuminated by, e.g., three lighting devices 120a-c and presence of occupants (e.g. persons) 150 in the area 110 is monitored by, e.g., three presence sensors 130a-c (e.g. motion detectors, sound detectors, heat detectors or other types of presence sensors), each monitoring a part 140a-c of the area 110. It is to be noted that FIG. 1 serves as an example only and that in most practical situations the area 110 is larger, is illuminated by a larger number of lighting devices 120a-c and is monitored by a larger number of presence sensors 130a-c. In particular, the number of presence sensors 130a-c may be different from the number of lighting devices 120a-c.

A lighting controller 160 receives presence information from the presence sensors 130a-c and, for control of the lighting devices 120a-c, determines light settings d based on the received presence information and a particular lighting control strategy. The light settings d determined by the lighting controller 160 may comprise one dimming level for each of the lighting devices 120a-c. The lighting control strategy may be, e.g., a localized illumination rendering, in which occupied parts of the area 110, i.e. the part 140a occupied by the person 150, are to be illuminated more (intensely) than unoccupied parts, i.e. parts 140b-c. Hence, the light settings d determined by the lighting controller 160 may be dimming levels for the lighting devices 120a-c, said light settings d controlling a lighting device 120a, arranged to illuminate the occupied part 140a of the region 110, to operate at full capacity, while the light settings d may control the other lighting devices 120b-c to operate at e.g. half capacity to reduce power consumption. When the occupant 150 moves to another part 140b of the area 110 (not shown in FIG. 1, as only one position of the occupant is depicted), a presence sensor 120b will detect his/her presence and the lighting controller 160 will determine new light settings d, causing a lighting device 120b to be adapted to illuminate the newly occupied part 140b of the area 110 and to operate at full capacity while the other lighting devices 120a and 120b may operate, e.g., at half capacity.

Figure 6:
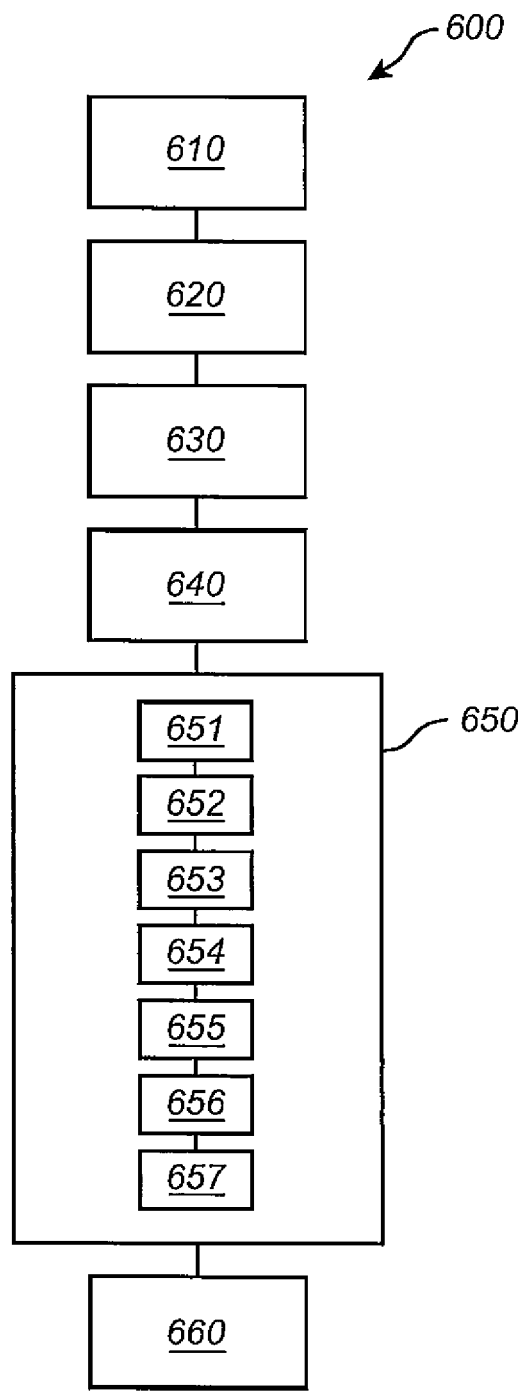
FIG. 6 is a general outline of a method according to an embodiment of the present invention.

A lighting control analyzer 170 may be connected to the lighting controller 160. With reference to FIGS. 1 and 6, an exemplifying embodiment of the lighting control analyzer 170 shown in FIG. 1 and adapted to perform the method illustrated in FIG. 6 will be described. The method 600 may comprise receiving 630 the light settings d, for example regularly or as often as the light settings are updated by the lighting controller 160 (e.g. once a second, ten times a second, or a hundred times a second). Optionally, the method 600 may comprise storing 640 the received light settings d, e.g., in a memory 171 arranged in the lighting control analyzer 170.

The lighting control analyzer 170 has information about the lighting control strategy used by the lighting controller 160 to determine the light settings d based on the presence information. For example, the method 600 may optionally comprise obtaining 620 this information, e.g., from the lighting controller 160. The method 600 may further comprise determining 650 occupancy behavior in the area, based on the received (and possibly also stored) light settings d and the lighting control strategy. The occupancy behavior may for example comprise information about how often occupants (persons) 150 occupy different parts 140a-c of the area 110 (this is referred to as occupancy levels), and/or information about locations that are normally occupied (this is referred to as occupant positions). The determination of the occupancy behavior of an area is described below in relation to FIGS. 2 to 5. The method 600 may optionally comprise providing 660 information (or control parameters) P, based on the occupancy behavior, for control of, e.g., illumination of the area 110; heating, ventilation and/or air conditioning of the area 110; and/or the flow of sunlight in the area 110. The information P may be transmitted, e.g., to the lighting controller 160 or to other systems related to the area 110.

Prior art methods of controlling various systems in buildings tend to use only local information available within a system. Hence, the above described way of controlling systems using relevant data from other systems (i.e. the information P) to improve performance may be advantageous compared to prior art methods. For instance, more energy efficient illumination from one lighting system may be obtained using lighting control information (e.g. the information P) from another lighting system.

Figure 2:
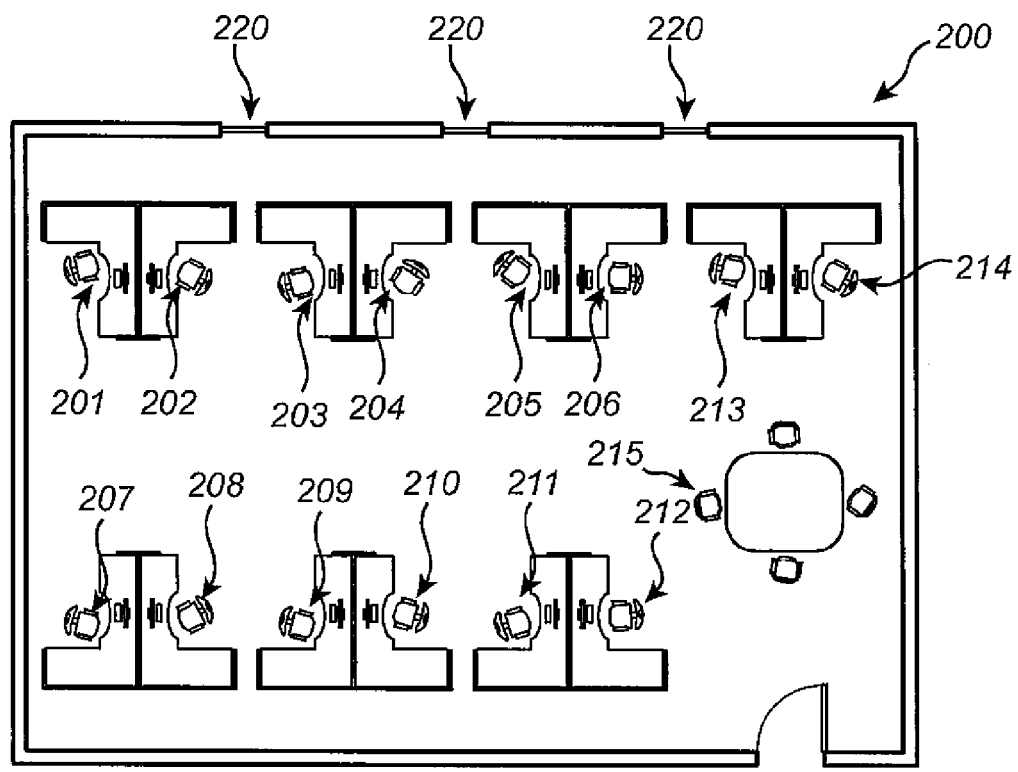
FIG. 2 shows a schematic top view of an office area.

FIG. 2 shows a schematic top view of an office area 200 which is illuminated by the lighting system 100 of FIG. 1 (not shown in FIG. 2), and in which occupancy behavior is to be determined/estimated by the lighting control analyzer 170 of FIG. 1. It is to be noted that the area 110 shown in FIG. 1 may be a subset of the office area 200 shown in FIG. 2, and that in order for the lighting system 100 to illuminate the office area 200, it may comprise more lighting devices 120a-c and presence sensors 130a-c than shown in FIG. 1. For example, a plurality of lighting devices and presence sensors (not shown in FIG. 2) may be, e.g., evenly distributed in the office area 200.

The office area 200 depicted in FIG. 2 as an example comprises a number of work stations or actual occupant positions 201-215, normally occupied by persons working in the office area 200. Occupant positions 201-215 are supposed to be located in chairs at desks distributed in the office area 200. Windows 220 are arranged along one of the walls of the office area 200 in this example.

Figure 3:
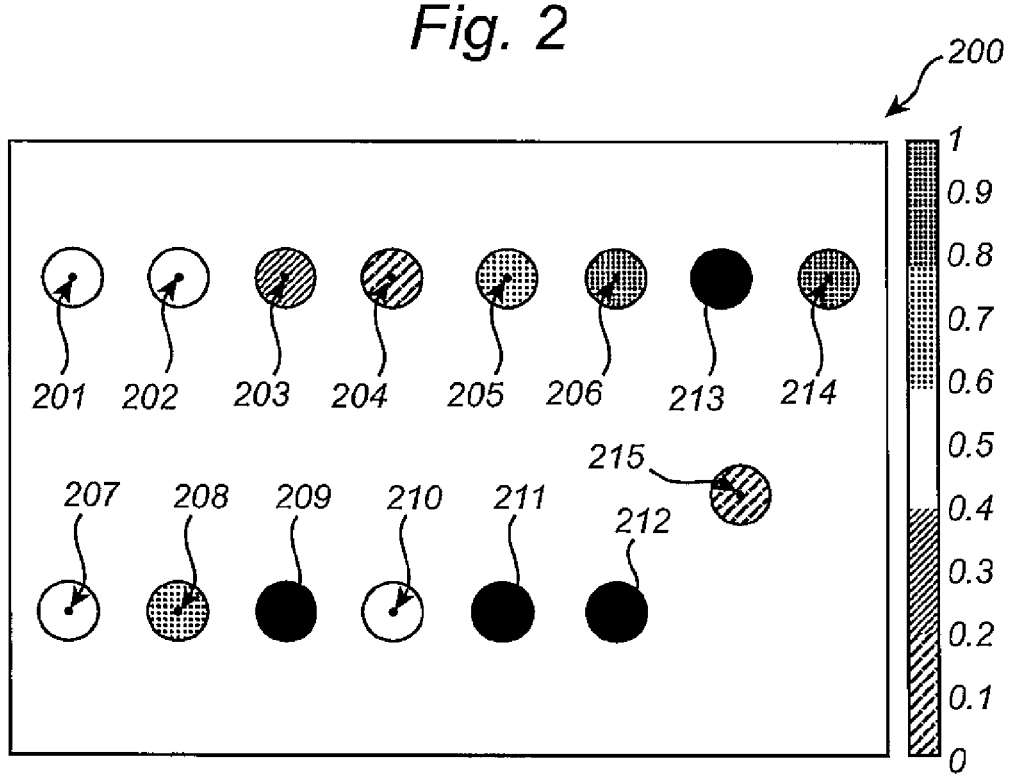
FIG. 3 shows a schematic top view of the office area of FIG. 2, with an example of actual occupancy levels and occupant positions.

With reference to FIG. 3, an example of actual occupancy levels and occupant positions in the office area of FIG. 2 will be described. These actual occupancy levels and occupant positions are examples of occupancy behavior to be determined (or estimated) by the lighting control analyzer 170 of FIG. 1. FIG. 3 shows a schematic top view of the office area 220 of FIG. 2, with an example of actual occupancy levels and actual occupancy positions 201-215. The actual occupancy levels are indicated as regions, around each of which actual occupant positions 201-215 are shown, the regions being filled by different patterns. The different patterns indicate different values of the occupancy levels. For example, the pattern around occupant positions 212 and 214 indicates high occupancy levels, which means that the occupant positions 212 and 214 are occupied by persons more often than other occupant positions, such as e.g. occupant positions 404 and 415 surrounded by a pattern indicating low occupancy levels. It is to be noted that the occupancy levels may be measured using different scales. The scale from 0 to 1, shown in FIG. 3, is an example scale in which an occupancy level close to 1 indicates that the corresponding location is occupied during a large part of a usual working day.

Figure 4:
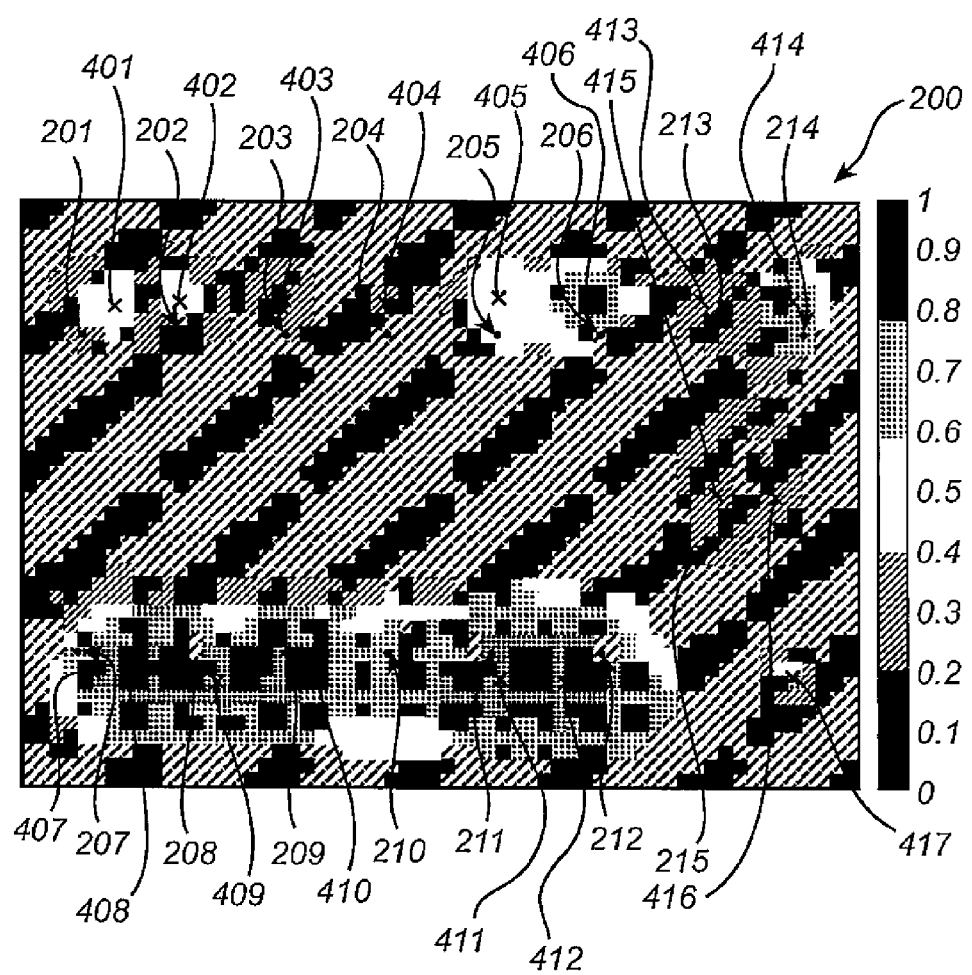
FIG. 4 shows a schematic top view of the office area of FIG. 2, with occupancy levels and occupant positions estimated by the lighting control analyzer in FIG. 1.

With reference to FIG. 4, an example of occupancy levels and occupant positions in the office area of FIG. 2, determined by the lighting control analyzer 170 of FIG. 1, will be described. These occupancy levels and occupant positions are examples of occupancy behavior and are the results of an attempt by the lighting control analyzer 170 to estimate the actual occupancy levels and occupant positions 201-215 depicted in FIG. 3. FIG. 4 shows a schematic representation of an example of occupancy levels and occupant positions 401-417 in the office area 200 of FIG. 2, determined by the lighting control analyzer 170. In the present example, the lighting controller 160 determines the light settings d using a localized illumination rendering strategy in which the dimming levels of the lighting devices are determined to provide a specified higher level (e.g., 500 lux) around occupied locations and a lower level (e.g., 300 lux) elsewhere in the office area 200.

The occupancy levels and occupant positions 401-417 may be determined by the lighting control analyzer 170, based on received dimming levels d, according to the following method:

Determine the combined illuminance I(x, y) provided by the lighting devices at each point (x, y) in the office area 200, based on the received dimming levels d, and compute an average illumination $I_{av}$ over the points in office area 200 (note that x and y axes are not represented in the drawings but may be arranged along two perpendicular walls of the office area 200).

For each point (x, y) satisfying $I(x, y) > I_{av}$, i.e. for which the estimated illuminance exceeds the average value, construct a circular region R(x, y) with center at (x, y) and radius r (chosen such that the region R(x, y) corresponds to a regular-sized work space, e.g., r=0.5 meters).

For each region R(x, y), determine the largest illuminance $I_x$ over the points in this region and assign the point (x, y) the weight $I(x, y)/I_{max}$. The weight $I(x, y)/I_{max}$ may be seen as a momentary occupancy level, in some sense indicative of a probability that the point (x, y), or at least its region, is currently occupied. Momentary occupancy levels of points (x, y) not satisfying $I(x, y) > I_{av}$ may preferably be assigned the value 0.

Determine the occupancy level for each point (x, y) in the office area 200 by forming a time average of the momentary occupancy levels $I(x, y)/I_{max}$ determined for that point.

For each point $(x_j, y_j)$ in the office area at which the occupancy level has a local maximum (the maximum value is denoted by $O_j$), define a circular region $R_j$ with center at the point $(x_j, y_j)$ and radius r (note that j is an index representing an example enumeration of the points at which the local maxima are located).

For each of the regions $R_j$, determine an occupant position by forming an average over all points in the region $R_j$ with occupancy level above $O_j/2$. The average may e.g. be computed as a linear mean, or as a position minimizing squared distances to the above mentioned points.

The outline of the above method may be summarized with reference to FIG. 6. The step of determining 650 the occupancy behavior may comprise determining 651 an illumination, based on a dimming level vector received at a certain time instant. The method 600 may optionally comprise obtaining 610 a mapping (or other information needed to perform said determining 651) between light settings for the lighting devices and the illumination provided by the lighting devices. Based on knowledge of the lighting control strategy (i.e. the localized illumination rendering), a momentary estimate of occupancy levels and occupant positions is made 652 based on the provided illumination. The step of determining 650 the occupancy behavior may comprise improving the estimation of occupancy levels 653 and occupant positions 654, based on building a distribution using further values of provided illuminations corresponding to other received dimming level vectors, for example 100 different dimming vectors (i.e. occupants of the office may possibly be at different locations at the time points corresponding to every one of these).

Comparing FIG. 4 with FIG. 2, it is clear that the determined occupant positions 401-417 and the surrounding determined occupancy levels are fairly accurate, i.e., correspond to the actual occupant positions 201-215 shown in FIG. 2 and the actual surrounding occupancy levels. The overestimation at a point denoted by 417, at the bottom-right corner of FIG. 4, may be a consequence of working with such limited knowledge as provided by only the dimming control values, instead of more direct information, such as input from presence sensors.

Figure 5:
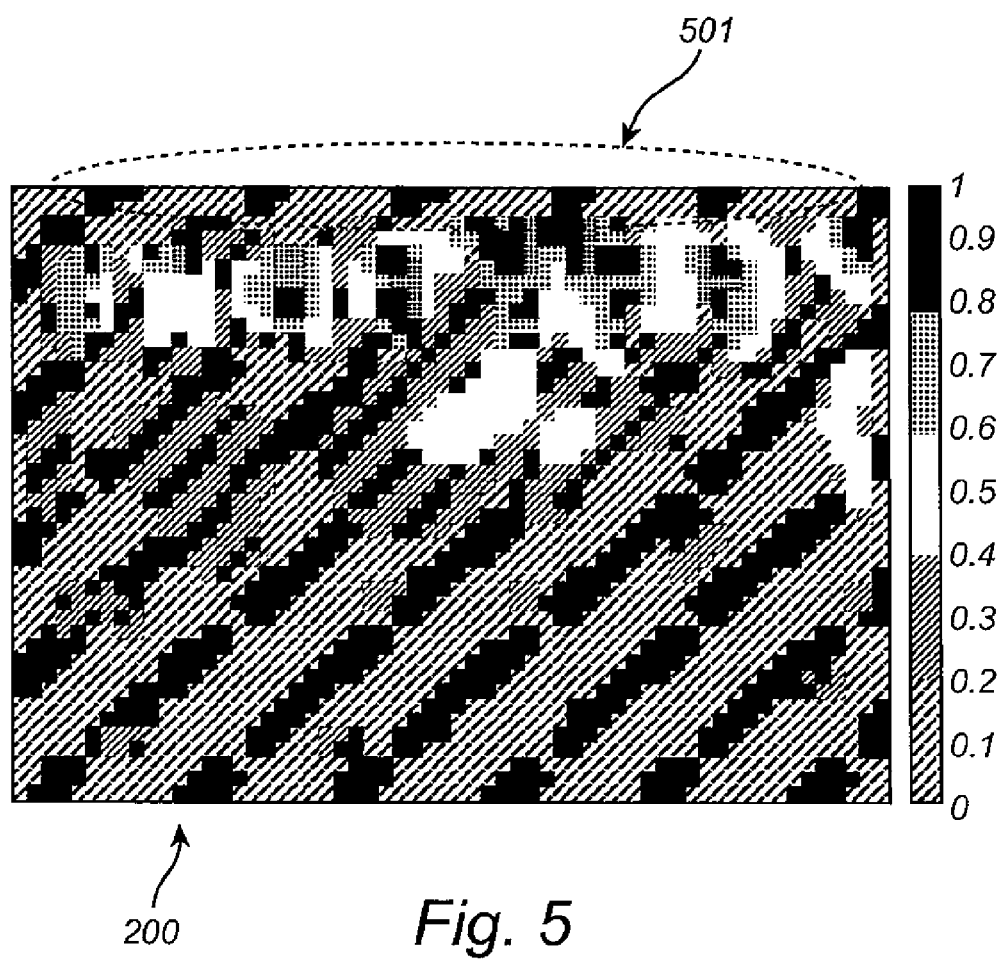
FIG. 5 shows a schematic top view of the office area of FIG. 2, with light contribution from external light sources (the sun) and a light ingress location (windows), both estimated by the lighting control analyzer in FIG. 1.

With reference to FIG. 5, an example external light contribution (e.g. daylight contribution) and a light ingress location in the office area of FIG. 2, both determined by the lighting control analyzer 170 of FIG. 1, will be described. This determined external light contribution and this light ingress location are the results of an attempt by the lighting control analyzer 170 to estimate the actual external light contribution and light ingress location (windows 220) of the office area 200. FIG. 5 shows a schematic representation of daylight contribution to the illumination and a daylight ingress location (i.e. windows) 501 in the office area 200 of FIG. 2, both estimated by the lighting control analyzer 170. Assuming that the lighting controller 160 employs the localized illumination rendering strategy described above, daylight ingress locations of the area 200 may be estimated by the control analyzer 170 using the following method:

For each point (x, y) in occupied regions $R_j$, form $$D'(x, y) = \left\{200 \times \frac{I(x, y)}{I_{max}} + 300 - I(x, y)\right\}^+$$

where the operator $\{z\}^+$ has value z for positive z and 0 for negative values, and $I_{max}$ is the maximal value of illuminances in a region R(x, y) of radius r around the point (x, y). The quantity D'(x, y) is a lower-bound daylight estimate.

For points (x, y) elsewhere, form the corresponding estimate by $$D'(x,y) = \{300 - I(x,y)\}^+$$

Form time averages of the lower-bound daylight estimates and identify a region of daylight ingress as a region with many points (x, y) for which these time averages are greater than a certain threshold.

The above method may be summarized with reference to FIG. 6. The step of determining 650 the occupancy behavior may comprise determining 655 an expected illumination of the area by the lighting devices, based on the determined occupancy levels/positions, i.e. 300 lux and 500 lux (scaled by $I(x, y)/I_{max}$) in unoccupied and occupied locations, respectively. It may further comprise comparing 656 the expected illumination with the actually provided illumination I(x, y) and estimating 657 light ingress locations, based on such comparisons for several time instants.

As shown in FIG. 5, the estimated daylight contribution is concentrated in the upper part of the office area 200 and suggests a daylight ingress location 501 along the upper wall of the office area 200. It is to be noted that the estimated daylight contribution may be measured using different scales. The scale from 0 to 1, shown in FIG. 5, is an example scale in which 1 corresponds to the highest estimated daylight contribution in FIG. 5, and 0 corresponds to no estimated daylight contribution.

Knowledge of occupancy levels, spatiotemporal occupancy patterns and daylight distribution may, e.g., be used to provide improved localized heating/cooling. In particular, heating/cooling conditions may be regulated in accordance with the number of occupants in close vicinity within an area, the amount of time an area has been occupied, and the proximity to a window source (which may be treated as a source of natural heat or cold, depending on weather conditions). Further, this knowledge may be used to provide, on the one hand, improved blind control, such as, allow a larger ingress of daylight and simultaneously improve the outside view from the office when there is no occupant close to the windows. On the other hand, in some instances when occupants are present in those locations close to the windows, it would be desirable to avoid direct sunlight (glare) so the blinds could be closed.

While embodiments of the invention have been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the lighting control analyzer receives light settings from multiple lighting systems (comprising lighting devices and lighting controllers), or where the lighting control analyzer receives light settings for control of a single lighting device adapted to illuminate different parts of an area by e.g. moving or rotating (or by the light output of the lighting device being e.g. directed or reflected to different parts of the area).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A lighting control analyzer for determining occupancy behavior in an area arranged to be at least partly illuminated by at least one lighting device controllable by a lighting controller, the lighting control analyzer configured to:

receive light settings for control of the at least one lighting device, the light settings being determined by the lighting controller using a lighting control strategy for said area, wherein the lighting control strategy represents a desired illumination of at least part of said area, based on presence information associated with at least one location in said area; and determine the occupancy behavior, based on the light settings and the lighting control strategy, wherein said light settings comprise dimming levels from at least one dimmer associated with said at least one lighting device, and wherein said lighting control analyzer is configured to determine an illuminance provided by said at least one lighting device at a plurality of locations in said area based on said received dimming levels.

2. The lighting control analyzer of claim 1, wherein the lighting control analyzer is configured to determine the occupancy behavior, based on light settings for a plurality of time instants.

3. The lighting control analyzer of claim 1, comprising a memory configured to store at least some of the received light settings, the lighting control analyzer configured to determine the occupancy behavior, based on at least some of the stored light settings.

4. The lighting control analyzer of claim 1, configured to:
determine, based on the received light settings, a level of illumination of at least part of said area, said illumination provided by the at least one lighting device, and
determine the occupancy behavior, based on the determined illumination level and the lighting control strategy.

5. The lighting control analyzer of claim 1, configured to determine momentary occupancy levels of locations in said area, based on illumination provided by said at least one lighting device and the lighting control strategy, wherein the momentary occupancy level of a location is indicative of the probability that said location is occupied at a certain time.

6. The lighting control analyzer of claim 5, further configured to determine, based on time averages of the determined momentary occupancy levels, at least one of:
occupancy levels of locations in said area, and
at least one occupant position in said area.

7. The lighting control analyzer of claim 1, further configured to:
determine, when the received light settings change from a first state corresponding to a power saving mode for said at least one lighting device to a second state corresponding to an active mode for said at least one lighting device, at least one entrance point as a location in said area at which said at least one lighting device is activate to provide illumination.

8. The lighting control analyzer of claim 1, further configured to detect when the received light settings correspond to a power saving mode for said at least one lighting device, and to indicate, in response to said detection, at least one of the group comprising:
a time point for determining a detection threshold for a presence sensor configured to provide information about presence of at least one occupant in at least one location of said area;
a time point for determining light contribution in said area from light sources other than said at least one lighting device;
a time point for determining a mapping between a light setting of a lighting device and illumination provided by the lighting device in at least one location of said area.

9. The lighting control analyzer of claim 1, further configured to:
estimate an expected illumination of said area by said at least one lighting device, based on the determined occupancy behavior and the lighting control strategy;
compare the expected illumination with illuminations corresponding to the received light settings for a plurality of time instants; and
determine at least one light ingress location of said area, based on the comparisons.

10. The lighting control analyzer of claim 1, being further configured to provide information based on the determined occupancy behavior, said information including control parameters selected from the group comprising:
control parameters for illumination of said area;
control parameters for at least one of heating, ventilation and air conditioning of said area; and
control parameters for controlling the flow of sunlight in said area.

11. The lighting control analyzer of claim 1, further configured to estimate potential power savings of the at least one lighting device, based on the received light settings, the lighting control strategy and the determined occupancy behavior.

12. A method of determining occupancy behavior in an area arranged to be at least partly illuminated by at least one lighting device, the method comprising:
receiving light settings for control of the at least one lighting device, the light settings determined using a lighting control strategy for said area, wherein the lighting control strategy represents a desired illumination of at least part of said area, based on presence information associated with at least one location in said area; and
determining the occupancy behavior, based on the light settings and the lighting control strategy, wherein said light settings comprise dimming levels from at least one dimmer associated with said at least one lighting device, said determining the occupancy behavior comprises determining an illuminance provided by said at least one lighting device at a plurality of locations in said area based on said received dimming levels.

* * * * *